United States Patent
Wittenmark et al.

(10) Patent No.: US 12,278,771 B2
(45) Date of Patent: Apr. 15, 2025

(54) LATENCY CONTROL FOR A COMMUNICATION NETWORK

(71) Applicant: Telefonaktiebolaget LM Ericsson (publ), Stockholm (SE)

(72) Inventors: Emma Wittenmark, Lund (SE); Christer Östberg, Staffanstorp (SE); Henrik Ronkainen, Södra Sandby (SE); Johan Strand, Staffanstorp (SE); Torbjörn Sölve, Malmö (SE); Kjell Gustafsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 94 days.

(21) Appl. No.: 18/012,017

(22) PCT Filed: Jul. 1, 2020

(86) PCT No.: PCT/EP2020/068582
§ 371 (c)(1),
(2) Date: Dec. 21, 2022

(87) PCT Pub. No.: WO2022/002397
PCT Pub. Date: Jan. 6, 2022

(65) Prior Publication Data
US 2023/0269193 A1    Aug. 24, 2023

(51) Int. Cl.
*H04L 47/283* (2022.01)
*H04L 47/125* (2022.01)
*H04L 47/30* (2022.01)

(52) U.S. Cl.
CPC .......... *H04L 47/283* (2013.01); *H04L 47/125* (2013.01); *H04L 47/30* (2013.01)

(58) Field of Classification Search
None
See application file for complete search history.

(56) References Cited

U.S. PATENT DOCUMENTS

| | | |
|---|---|---|
| 10,592,578 B1 | 3/2020 | Mokashi et al. |
| 11,228,516 B1 | 1/2022 | Harwani |

(Continued)

FOREIGN PATENT DOCUMENTS

| | | |
|---|---|---|
| GB | 2399989 A | 9/2004 |
| WO | WO 2019/240770 A1 | 12/2019 |

OTHER PUBLICATIONS

Spreadtrum Communications, "Handling of collision involving measurement gap," 3GPP TSG-RAN WG2 Meeting #110 electronic, R2-2005051, Online, Jun. 1-12, 2020, 3 pages.

(Continued)

*Primary Examiner* — June Sison
(74) *Attorney, Agent, or Firm* — Sage Patent Group

(57) ABSTRACT

A method for latency control in a communication network is disclosed. The method includes identifying that a service is currently associated with a user device associated with the communication network, wherein a deviation between a latency requirement of the service and an internal latency performance of the communication network is bounded, and dynamically adjusting a configuration of the communication network for the service.

In some embodiments, the dynamic adjustment is performed only for user devices associated with services with bounded deviation between the latency requirement of the service and the internal latency performance of the communication network.

In some embodiments, dynamically adjusting the configuration of the communication network comprises controlling the communication network to provide latencies below a maximum latency threshold for the service.

In some embodiments, the dynamic adjustment of the configuration of the communication network is based on the current traffic load.

20 Claims, 3 Drawing Sheets

(56) References Cited

U.S. PATENT DOCUMENTS

| | | | |
|---|---|---|---|
| 11,659,444 B1 | 5/2023 | Xing | |
| 2010/0039938 A1* | 2/2010 | Sagfors | H04L 47/29 370/412 |
| 2011/0044262 A1 | 2/2011 | Satapathy et al. | |
| 2011/0199934 A1* | 8/2011 | Olofsson | H04W 76/27 370/252 |
| 2013/0065632 A1 | 3/2013 | Macias et al. | |
| 2013/0223222 A1 | 8/2013 | Kotecha et al. | |
| 2014/0355428 A1 | 12/2014 | Smith et al. | |
| 2015/0341832 A1 | 11/2015 | Hwang et al. | |
| 2016/0212674 A1 | 7/2016 | Nakamura et al. | |
| 2016/0302128 A1 | 10/2016 | Anchan | |
| 2018/0115392 A1 | 4/2018 | Yang et al. | |
| 2018/0242191 A1 | 8/2018 | Lundqvist et al. | |
| 2018/0288641 A1* | 10/2018 | Mildh | H04W 24/10 |
| 2019/0014050 A1 | 1/2019 | Wang et al. | |
| 2019/0158371 A1 | 5/2019 | Dillon et al. | |
| 2020/0015121 A1 | 1/2020 | Misra et al. | |
| 2020/0053018 A1 | 2/2020 | White et al. | |
| 2020/0084142 A1 | 3/2020 | Bochkar | |
| 2020/0120036 A1 | 4/2020 | Zhou et al. | |
| 2020/0195539 A1 | 6/2020 | Sivaraj et al. | |
| 2020/0336945 A1* | 10/2020 | Gapin | H04L 47/803 |
| 2021/0112006 A1 | 4/2021 | Francini et al. | |
| 2022/0417166 A1 | 12/2022 | Sivaraj et al. | |

OTHER PUBLICATIONS

International Search Report and Written Opinion of the International Searching Authority, PCT/EP2020/068581, mailed Mar. 30, 2021, 12 pages.

International Search Report and Written Opinion of the International Searching Authority, PCT/EP2020/068582, mailed Mar. 29, 2021, 11 pages.

International Search Report and Written Opinion of the International Searching Authority, PCT/EP2020/068577, mailed Mar. 24, 2021, 13 pages.

International Search Report and Written Opinion of the International Searching Authority, PCT/EP2020/068578, mailed Mar. 15, 2021, 9 pages.

International Search Report and Written Opinion of the International Searching Authority, PCT/EP2020/068580, mailed Mar. 24, 2021, 18 pages.

3GPP TSG-RAN WG2 #103-bis, Tdoc R2-1912357, Chongqing, China, Oct. 14-18, 2019, Agenda Item 7.3.2.1.1, Ericsson, "Handover Interruption Reduction for UM Bearers," (XP051803851) 4 pages.

Kumar, R., et al., "Design Of An Enhanced Bearer Buffer for Latency Minimization in the Mobile RAN," 2019 IEEE Global Communications Conference (BLOBECOM) Dec. 9, 2019 (XP033722312) 6 pages.

De Schepper, K., et al., Identifying Modified Explicit Congestion Notification (ECN) Semantics for Ultra-Low Queuing Delay (L4S) Mar. 9, 2020 (XP015138622) 45 pages.

Briscoe, B., Ed., et al., "Low Latency, Low Loss, Scalable Throughput (L4S) Internet Service: Architecture," Transport Area Working Group, Internet Draft, draft-ietf-tsvwg-l4s-arch-06, Mar. 9, 2020, 29 pages.

Le Boudec, J-Y, "Rate adaptation, Congestion Control and Fairness: A Tutorial," Ecole Polytechnique Federale de Lausanne (EPFL), Sep. 12, 2014, 45 pages.

Molisch, A., "Wireless Communications," Wireless Communications, Second Edition, © 2011 John Wiley & Sons Ltd., 884 pages.

* cited by examiner

LATENCY CONTROL FOR A COMMUNICATION NETWORK

CROSS REFERENCE TO RELATED APPLICATIONS

This application is a 35 U.S.C. § 371 national stage application of PCT International Application No. PCT/EP2020/068582 filed on Jul. 1, 2020, the disclosure and content of which is incorporated by reference herein in its entirety.

TECHNICAL FIELD

The present disclosure relates generally to the field of wireless communication. More particularly, it relates to latency control in wireless communication scenarios.

BACKGROUND

Different forms of latency control are generally applied in wireless communication scenarios.

In some situations, existing approaches for latency control do not provide for desirable performance.

Therefore, there is a need for alternative approaches for latency control.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for latency control in a communication network. The method comprises identifying that a service is currently associated with a user device associated with the communication network, wherein a deviation between a latency requirement of the service and an internal latency performance of the communication network is bounded, and dynamically adjusting a configuration of the communication network for the service.

In some embodiments, dynamically adjusting the configuration of the communication network is performed only for services with bounded deviation between the latency requirement of the service and the internal latency performance of the communication network.

In some embodiments, dynamically adjusting the configuration of the communication network comprises controlling the communication network to provide latencies below a maximum latency threshold for the service.

In some embodiments, the method further comprises determining a current traffic load of the communication network, and wherein dynamically adjusting the configuration of the communication network is based on the current traffic load.

In some embodiments, dynamically adjusting the configuration of the communication network comprises using a first adjustment approach when the current traffic load is less than a first traffic load threshold value, and using a second adjustment approach when the current traffic load is higher than, or equal to, the first traffic load threshold value.

In some embodiments, dynamically adjusting the configuration of the communication network comprises performing adjustment only when the current traffic load is less than a second traffic load threshold value.

In some embodiments, the method further comprises monitoring one or more buffers associated with the service, wherein dynamically adjusting the configuration of the communication network is triggered when a buffer size exceeds a buffer size threshold value.

In some embodiments, dynamically adjusting the configuration of the communication network for the service comprises one or more of: assigning a bearer dedicated for low latency requirements to the service, increasing a number of resources for initial uplink grant, decreasing a duration between consecutive scheduling request opportunities, decreasing a target error rate, decreasing a coding rate used for retransmissions, decreasing an order of modulation used for retransmissions, decreasing a maximum coding rate, decreasing a maximum order of modulation, using only systematic encoding schemes, decreasing a maximum number of retransmissions, adjusting a duration of one or more timers used for medium access control (MAC) and/or radio link control (RLC) and/or discontinuous reception (DRX), and disabling a measurement gap when it coincides with a retransmission occasion.

In some embodiments, identifying that a service is currently associated with a user device, wherein the deviation between the latency requirement of the service and the internal latency performance of the communication network is bounded, comprises one or more of: detecting that a service class identifier is indicative of the service, detecting that a bearer dedicated for low latency requirements is assigned for the service, and determining that a traffic pattern of the service matches a latency sensitive traffic pattern.

In some embodiments, the bounded deviation between the latency requirement of the service and the internal latency performance of the communication network comprises one or more of: a ratio between a latency requirement parameter value of the service and an internal latency performance parameter value of the communication network not exceeding a bounding threshold, a latency requirement parameter value of the service and an internal latency performance parameter value of the communication network being in a same order of magnitude, a latency requirement parameter value of the service and an internal latency performance parameter value of the communication network being equal, and a required end-to-end round-trip-time of the service falling within a time range specified relative an internal round-trip-time of the communication network.

In some embodiments, the service has a maximum allowable latency which is lower than that of mobile broadband, MBB, services and/or higher than that of ultra-reliable low latency communication, URLLC, services.

In some embodiments, the latency control comprises one or more of: decrease of latency variance associated with the communication network for the user device, decrease of a maximum latency associated with the communication network for the user device, decrease of a number of latency events associated with the communication network for the user device, that exceed a latency threshold value, and decrease of an average latency associated with the communication network for the user device.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for latency control in a communication network. The apparatus comprising controlling circuitry configured to cause identification that a service is currently associated with a user device associated with the communication network, wherein a deviation between a latency requirement of the service and an internal latency performance of the communication network is bounded, and dynamic adjustment of a configuration of the communication network for the service.

A fourth aspect is a network node comprising the apparatus of the third aspect.

In some embodiments, any of the above aspects may additionally have features identical with or corresponding to any of the various features as explained above for any of the other aspects.

An advantage of some embodiments is that alternative approaches for latency control are provided. Generally, the alternative approaches for latency control may be used instead of, or together with, other approaches for latency control, as suitable.

An advantage of some embodiments is that the probability of occurrences with relatively large latency (e.g., latency spikes) may be reduced.

An advantage of some embodiments is that the average latency may be reduced.

An advantage of some embodiments is that the latency variance may be reduced.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Figure 1:
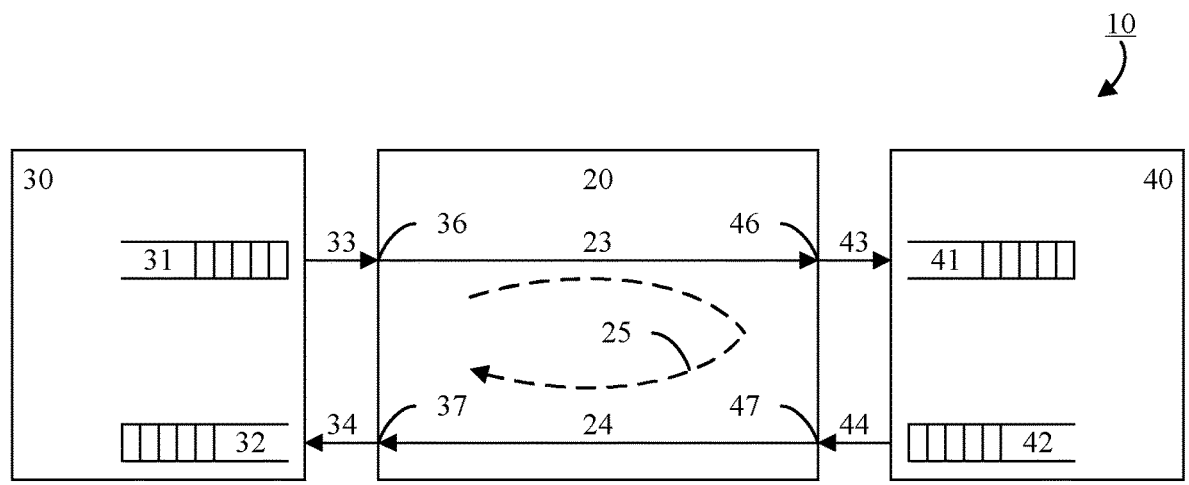
FIG. 1 is a schematic block diagram illustrates an example communication scenario according to some embodiments.

As mentioned before, different forms of latency control are generally applied in wireless communication scenarios. FIG. 1 schematically illustrates a communication scenario 10 for demonstrating a type of situation where latency control may be challenging.

The communication scenario 10 comprises two communication end points 30, 40 and a communication network 20. The communication network 20 is for carrying information (e.g., data and/or control information) from end point 30 to end point 40 as illustrated by 33, 23, and 43 and/or from end point 40 to end point 30 as illustrated by 44, 24, and 34.

The end points 30, 40 may be any suitable communication end points. One example of a communication end point pair is an application client-server pair.

Depending on the type of service the end points 30, 40 are engaged in, there may be different latency requirements on the communication between the end points 30, 40.

Generally, latency of communication between the end points 30, 40 may be defined as one or more of: a time for transfer of information from end point 30 to end point 40 (possibly defined as a time between information entering a transmission buffer 31 associated with the end point 30 and the same information being dispatched from a reception buffer 41 associated with the end point 40), a time for transfer of information from end point 40 to end point 30 (possibly defined as a time between information entering a transmission buffer 42 associated with the end point 40 and the same information being dispatched from a reception buffer 32 associated with the end point 30), a time from issuing of first information at end point 30 (possibly defined as a time when the first information enters a transmission buffer 31 associated with the end point 30) to reception of second information at end point 30 (possibly defined as a time when the second information is dispatched from a reception buffer 32 associated with the end point 30) wherein the second information is issued by end point 40 in response to reception of the first information, and a time from issuing of first information at end point 40 (possibly defined as a time when the first information enters a transmission buffer 42 associated with the end point 40) to reception of second information at end point 40 (possibly defined as a time when the second information is dispatched from a reception buffer 41 associated with the end point 40) wherein the second information is issued by end point 30 in response to reception of the first information.

Alternatively or additionally, and generally, latency of communication between end points may be characterized by one or more of: an average duration of end point to end point transfer, a minimum duration of end point to end point transfer, a maximum duration of end point to end point transfer, a variance of the duration of end point to end point transfer, and a probability that duration of end point to end point transfer exceeds a duration threshold. Generally, end point to end point transfer may refer to a one way transfer or to a round-trip-time (RTT).

The latency requirements on the communication between the end points may be defined according to any of the above, or other suitable, definitions and characterization. For example, a specific service may require that the time from issuing of first information at end point 30 to reception of second information at end point 30 (wherein the second information is issued by end point 40 in response to reception of the first information) is below a maximum duration value and/or has a variance below a maximum variance value.

The communication network 20 may be any suitable communication network. One example of a communication network is any wireless communication network operating in accordance with a standard advocated by the third generation partnership project (3GPP); e.g., the universal mobile telecommunication system (UMTS), UMTS long term evolution (LTE), or a fifth generation (5G) system. The communication network may, for example, comprise a radio access network (RAN) and/or a core network (CN).

The communication network 20 typically has an internal latency performance, schematically illustrated by 25.

The internal latency performance 25 of the communication network 20 determines (e.g., limits) how quickly information delivered to the communication network at 36 can be transferred through the communication network over 23 and provided at 46 and/or how quickly information delivered to the communication network at 47 can be transferred through the communication network over 24 and provided at 37.

The internal latency performance 25 of the communication network 20 may be characterized in terms of the duration (delay) of the transfer over 23 and/or 24. For example, the internal latency performance 25 of the communication network 20 may be characterized by one or more of: an average duration of transfer through the communication network, a minimum duration of transfer through the communication network, a maximum duration of transfer through the communication network, a variance of the duration of transfer through the communication network, and a probability that duration of transfer through the communication network exceeds a duration threshold.

Generally, transfer through the communication network may refer to a one way transfer or to a round-trip-time (RTT).

The internal latency performance 25 of the communication network 20 may be caused by one or more of various (standardized or non-standardized) settings and limitations of the communication network. Some example settings and limitations of a communication network that inherently introduce latency include—but are not limited to—standardized time domain dimensions of communication resources (e.g., time duration of one or more units for communication), scheduling principles, protocols (e.g., retransmission protocols such as hybrid automatic repeat request—HARQ), and response requirements (e.g., for acknowledgement—ACK).

When the latency requirements on the communication between the end points are easily accommodated by the internal latency performance of the communication network, the end-to-end communication scenario is unproblematic from a latency perspective.

Such situations may, for example, occur when an average duration of transfer through the communication network is much lower than a required average duration of end point to end point transfer, when a maximum duration of transfer through the communication network is much lower than a required maximum (or average) duration of end point to end point transfer, and/or when a variance of duration of transfer through the communication network is much lower than a required maximum variance of duration of end point to end point transfer.

When the latency requirements on the communication between the end points are impossible to fully accommodate by the internal latency performance of the communication network, the end-to-end communication scenario is infeasible from a latency perspective.

Such situations may, for example, occur when an average duration of transfer through the communication network is much higher than a required average duration of end point to end point transfer, when a minimum duration of transfer through the communication network is higher than a required minimum (or average) duration of end point to end point transfer, and/or when a variance of duration of transfer through the communication network is higher than a required maximum variance of duration of end point to end point transfer.

These problems may be solved by application of a different communication network, or a specifically designed communication type within the communication network, to accommodate the latency requirements on the communication between the end points.

Embodiments presented herein are particularly applicable in situations which are neither of the above, i.e., situations when the latency requirements on the communication between the end points are not impossible, but not easy either, to accommodate by the internal latency performance of the communication network. Then, the end-to-end communication scenario is feasible, but problematic (e.g., presenting challenges), from a latency perspective. This may be seen as the end-to-end communication scenario comprising a service which is latency sensitive (i.e., with latency requirements on the communication between the end points) in relation to the internal latency performance of the communication network (i.e., latency sensitive service).

Such situations may, for example, occur when an average duration of transfer through the communication network is similar to a required average duration of end point to end point transfer, when a maximum duration of transfer through the communication network is similar to a required maximum duration of end point to end point transfer, and/or when a variance of duration of transfer through the communication network is similar to a required maximum variance of duration of end point to end point transfer.

Generally, a latency sensitive service associated with a user device of a communication network may be defined as a service with latency requirements on the communication between the end points which are similar to the internal latency performance of the communication network.

For example, a latency sensitive service associated with a user device of a communication network may be defined as a service with one or more latency requirement parameter value (e.g., average duration of transfer, maximum duration of transfer, variance of transfer duration, etc.) for the communication between the end points being in the same order of magnitude as the value of a corresponding parameter of the internal latency performance of the communication network.

Alternatively or additionally, a latency sensitive service associated with a user device of a communication network may be defined as a service with one or more latency requirement parameter value (e.g., average duration of transfer, maximum duration of transfer, variance of transfer duration, etc.) for the communication between the end points deviating from the value of a corresponding, or otherwise relevant, parameter of the internal latency performance of the communication network by less than a threshold value.

Alternatively or additionally, a latency sensitive service associated with a user device of a communication network may be defined as a service with a requirement of maximum duration of transfer for the communication between the end points which is lower than a maximum duration of transfer through the communication network.

Alternatively or additionally, a latency sensitive service associated with a user device of a communication network may be defined as a service with a requirement of average duration of transfer for the communication between the end points deviates from an average duration of transfer through the communication network by less than a threshold value.

Alternatively or additionally, a latency sensitive service associated with a user device of a communication network may be defined as a service with a requirement of variance of duration of transfer for the communication between the end points which is lower than a value based on a variance of duration of transfer through the communication network (e.g., lower than the variance of duration of transfer through the communication network, or lower than the variance of duration of transfer through the communication network plus or minus a bias value).

The problems associated with latency sensitive services may be solved in the same way as situations where the end-to-end communication scenario is infeasible from a latency perspective, i.e., by application of a different communication network, or a specifically designed communication type within the communication network, to more easily accommodate the latency requirements on the communication between the end points. However, application of a communication network (or a specifically designed communication type within a communication network) which accommodates strict latency requirements on the communication between the end points is typically inefficient in terms of throughput and/or capacity. For example, increasing the amount of allocated communication resources is one approach that is helpful to accommodate strict latency requirements on the communication between the end points, but has a negative impact on overall throughput of the communication network.

Therefore, there is a need for alternative approaches for latency control, which preferably address the problems associated with latency sensitive services (i.e., services with a sensitive relationship between latency requirements on the communication between the end points and the internal latency performance of the communication network).

A more detailed context will now be described, in relation to which embodiments may be particularly applicable. It should be noted that the following context is merely an illustrative example and not to be construed as limiting.

Some typical existing wireless communication networks (e.g., 3GPP-based networks supporting fourth generation, 4G, and earlier releases of the communication standard) are mainly optimized for mobile broadband (MBB) services and voice services. Generally, MBB traffic is not particularly latency sensitive but can be very throughput demanding. For example, for streaming services latency is typically handled by using large buffers which will efficiently hide latency jitter caused by latency events in the communication network, and thereby provide good end user experience. This exemplifies situations when the latency requirements on the communication between the end points are easily accommodated by the internal latency performance of the communication network, and the end-to-end communication scenario is unproblematic from a latency perspective.

In later releases of 4G, and especially in 5G, services of other types than MBB and voice have come into focus. One example is ultra-reliable low latency communication (URLLC) services. URLLC may be particularly suitable for industrial applications. Within 3GPP standardization, features are developed to support these new URLLC services and use cases. This exemplifies situations when the latency requirements on the communication between the end points are impossible to fully accommodate by the internal latency performance of the communication network, the end-to-end communication scenario is infeasible from a latency perspective, and a specifically designed communication type within the communication network is applied to accommodate the latency requirements on the communication between the end points.

Embodiments presented herein are particularly applicable in situations which are neither of the above (MBB, voice, and URLLC), i.e., situations when the latency requirements on the communication between the end points are not impossible, but not easy either, to accommodate by the internal latency performance of the communication network (referred to herein as latency sensitive services). In some embodiments, a relatively high throughput is also required (which is typically not the case for services requiring a specifically designed communication type, e.g., URLLC).

Some typical example services where embodiments may be particularly applicable—e.g., in the context of a 3GPP-based communication network—are gaming applications (gaming with or without rendering, and including multi-user gaming), augmented reality (AR), virtual reality (VR), and tele-operated vehicle control (e.g., driving).

Generally, the latency through the radio network (RAN), the core network (CN), and all the way to the communication end points (e.g., application client and application server) needs to be considered in view of latency requirements on the communication between the end points. One approach to reduce the impact of CN latency and/or of latency between the communication network and the application server, is to apply an edge cloud deployment of the application.

For situations when the latency requirements on the communication between the end points are not impossible, but not easy either, to accommodate by the internal latency performance of the communication network, some example latency requirements include a maximum round-trip-time (RTT) for communication between end points (end-to-end, E2E, RTT) in any of the ranges 10-100 ms, 30-100 ms, 30-50 ms, and 80-100 ms, and/or some example throughput requirements include a throughput in the range 5-10 Mbps or there over; up to 400 Mbps (e.g., for VR streaming applications).

For situations when the latency requirements on the communication between the end points are not impossible, but not easy either, to accommodate by the internal latency performance of the communication network, it may be further beneficial to consider reliability of the communication (e.g., measured as the probability of delivering traffic within a specified time duration, i.e., fulfilling the latency requirement). The reliability is tightly coupled with the latency requirements (without any latency requirement, the traffic can always be delivered, e.g., by using sufficiently many retransmissions). Thus, reliability is a relevant metric when a communication network is tuned for latency sensitive traffic.

Thus, some communication networks are typically dimensioned and configured to provide services (e.g., for MBB traffic) with high throughput and relatively relaxed latency requirements. Although latency is typically considered in such communication networks (e.g., in relation to transmission control protocol, TCP, throughput and ramp-up times), predictable latency (i.e., low latency variance) is typically not required. One explanation to the latter is that the timing requirements in some human-machine interaction (e.g., web-browsing and video streaming) is quite relaxed and rather large latency variations can be hidden with buffers.

For latency sensitive services, however, extensive use of buffers is not possible due to the nature of the applications (e.g., quick reaction times required for gaming, fast control response required for vehicle tele-operation, etc.). Typically, a latency spike will have negative impact on the application experience/performance for latency sensitive services. Some example events in a communication network that may cause latency spikes include handovers, slow fading dips, and fast fading dips.

In association with some typical communication networks (e.g., 3GPP-based networks for 4G and 5G), efforts are made to reduce overall latency (e.g., reducing the average latency). This, however, does not exclude a relatively large maximum latency and/or a relatively large latency variation (which may result in latency spikes, for example).

Regarding handover, some typical communication networks (e.g., 3GPP-based networks for 4G and 5G) apply a handover mechanism where service by one cell is released before service setup towards a target cell is completed. This mechanism causes a brief communication interruption during the handover procedure. The interruption may, for example, be in the range 30-60 ms, or considerably longer (e.g., up to 100 ms, or up to several hundreds of ms, such as 200 ms, 500 ms, or 900 ms).

For MBB services and voice services, these handover interruptions typically do not negatively affect the quality of the services, since the latency caused by the interrupt can be hidden with buffer management. For latency sensitive services, however, the length of these handover interruptions may be in the same order of magnitude as the latency requirements of the service, and a handover can negatively affect the quality of the service.

Hence, some approaches for latency control may comprise avoiding unnecessary handovers, at least for latency sensitive services, while performing handovers that are necessary to maintain connection between the communication network and a device operating at the communication end point.

Alternatively or additionally, some approaches for latency control may comprise controlling the setting of one or more network configuration parameter, at least for latency sensitive services.

Generally, there are many network configuration parameters that potentially impact the latency of a communication network. Examples include: the scheduling request periodicity (for UE initiated transmissions), the coding and modulation selected for HARQ retransmissions, the maximum number of HARQ retransmissions, timer settings in medium access control (MAC), timer settings in radio link control (RLC).

For MBB services and voice services, the setting of these configuration parameters typically have negligible impact on the user experience, since any un-acceptable latency jitter can be hidden with buffer management. For latency sensitive services, however, the setting of these configuration parameters can have a negative effect on the user experience since they might affect the variation in latency and/or the maximum latency.

Hence, some approaches for latency control may comprise controlling the setting of one or more network configuration parameter, at least for latency sensitive services, to provide latencies which are predictable (i.e., low variation in latency) and relatively low (i.e., low maximum latency).

Generally, some approaches for latency control may comprise keeping latency predictable and relatively low (bounded and predictable), while (preferably) enabling maintenance of the communication connection through the communication network at a predictable throughput. Thereby, latency sensitive services can be satisfactorily supported in the communication network.

Alternatively or additionally, some approaches for latency control may comprise, at least for latency sensitive services, informing the application about current and/or future conditions of the communication network that impact throughput and/or latency.

For example, when the application receives information that the throughput of the communication network throughput is decreasing, or predicted to decrease in a near future, the application can adapt to this situation. Example adaptions by the application include lowering of a data rate (e.g., by lowering an encoder rate, such as a video encoding rate).

Some communication networks already have approaches for differentiating services in RAN, which may be used for differentiation also in relation to latency sensitive services as defined herein. In some embodiments, such approaches may be combined with the alternative approaches for latency control presented herein.

Examples of already existing approaches for differentiating services in RAN include slicing, dedicated bearers, resource assignment differentiation, scheduling prioritization, etc. For example, some legacy solutions allow an operator to assign more or less resources and/or set a priority for a bearer that transport a specific service type (e.g., voice over LTE, VoLTE). Such approaches may comprise assigning different service class identifiers (e.g., quality-of-service class identifier—QCI, 5QI, etc.) to different bearers based on which type of service is carried by the bearer. Alternatively or additionally, some legacy solutions allow an operator to enable different types of services based on which type of subscription is associated with a user device.

Figure 2:
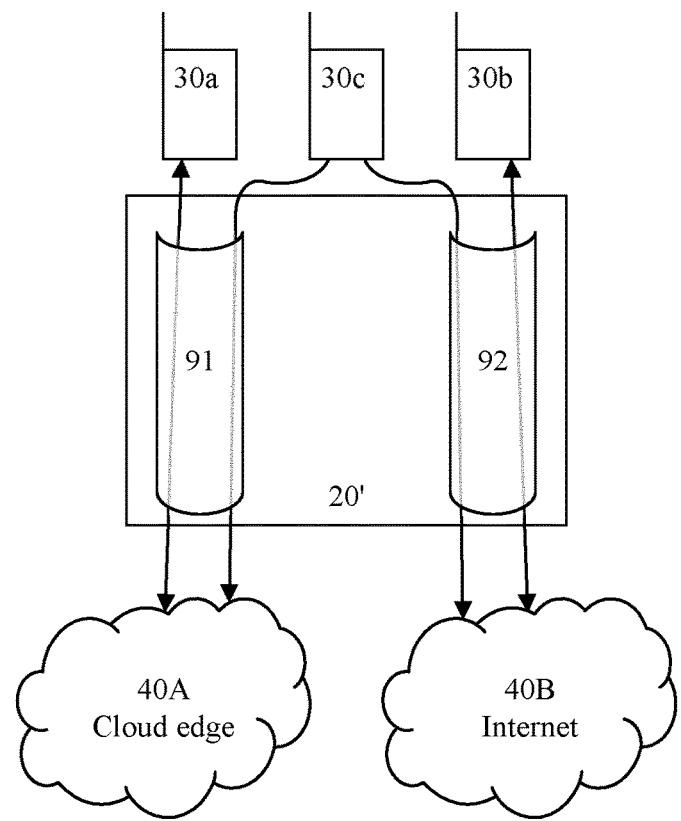
FIG. 2 is a schematic block diagram illustrates an example communication scenario according to some embodiments.

FIG. 2 schematically illustrates a communication scenario with differentiated bearers. The user device 30*a* communicates with an application dwelling in the Internet 40A via the communication network 20', using a bearer 91. The user device 30*b* communicates with an application associated with a latency sensitive service via the communication network 20', using another bearer 92. To reduce end-to-end latency, the application dwells in a cloud edge 40B. The user device 30*c* communicates with an application dwelling in the Internet 40A using the bearer 91, as well as with an application associated with a latency sensitive service dwelling in the cloud edge 40B using the bearer 92.

The different bearers 91, 92 may be differentiated to provide different latency characteristics as exemplified above, using any suitable latency approach (e.g., any of the alternative approaches for latency control described herein).

As mentioned above, alternative approaches for latency control are provided by this disclosure. Some embodiments of the approaches for latency control address the problems associated with latency sensitive services (i.e., services with a sensitive relationship between latency requirements on the communication between the end points and the internal latency performance of the communication network).

A possible principle for alternative approaches for latency control is to improve the internal latency performance of the communication network (e.g., decreasing the maximum duration of transfer through the communication network, and/or decreasing the average duration of transfer through the communication network, and/or decreasing the variance of duration of transfer through the communication network, etc.). This may, for example, be achieved by avoiding unnecessary handovers and/or by controlling the setting of one or more network configuration parameter.

Another possible principle for alternative approaches for latency control is to dynamically vary the utilization of the communication network by the service in view of the latency requirements on the communication between the end points. For example, temporarily (when the internal latency performance of the communication network is poor) lowering a communication rate that the service applies in the communication network may temporarily improve the internal latency performance of the communication network (e.g., due to less HARQ retransmissions, etc.) at the cost of reduced throughput. The latter may be mitigated by temporary buffer build-up (compare e.g., with 31 and 42 of FIG. 1) within the boundaries set by latency requirements on the communication between the end points. This may, for example, be achieved by informing the application about current and/or future conditions of the communication network to allow the application to adjust its data rate.

The above possible principles may be used alone or in combination.

In some embodiments, the above possible principles are used exclusively for latency sensitive services, or only for communication end points associated with a latency sensitive service.

In the following, embodiments will be described where alternative approaches for latency control are provided. Some embodiments are particularly suitable for latency control in situations as that described in connection with FIG. 1. Furthermore, some embodiments apply the principle to improve the internal latency performance of the communication network.

Figure 3:
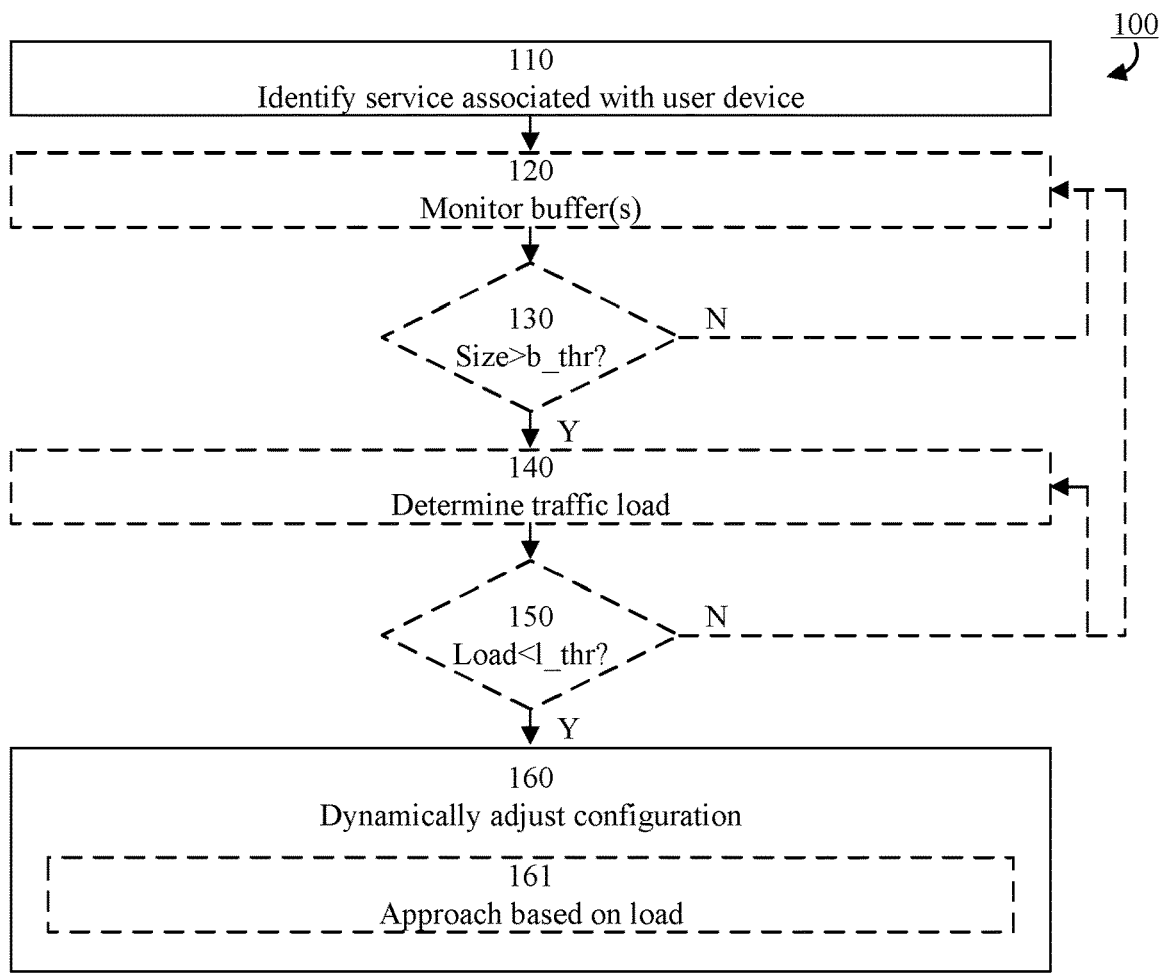
FIG. 3 is a flowchart illustrating example method steps according to some embodiments.

FIG. 3 illustrates an example method 100 according to some embodiments. The method is for latency control in a communication network (compare with communication networks 20 of FIG. 1 and 20' of FIG. 2). The communication network is typically configured to serve a plurality of users (compare with 30a, 30b, 30c of FIG. 2).

Generally, latency control may refer to one or more of: mitigation of latency spikes, reduction/decrease of latency variance/variation associated with the communication network for the user device, reduction/decrease of average latency associated with the communication network for the user device, reduction/decrease of the probability for (i.e., number—e.g., per time unit—of) latency events associated with the communication network for the user device that exceed a latency threshold value, reduction/decrease of a maximum latency associated with the communication network for the user device, or any other suitable change in latency behavior.

A user device may, for example, comprise one of the communication end points 30, 40 of FIG. 1, one of the user devices 30a, 30b, 30c of FIG. 2, a user equipment (UE), a station (STA), or similar.

Also generally, latency control may be for mitigation of latency variations and/or for providing predictable latency and/or for providing reliable communication.

In typical embodiments, the latency control is performed under a throughput condition (e.g., that throughput should be kept at, or above, a minimum acceptable throughput).

In step 110, it is identified that a service is currently associated with a user device—the user device in turn being associated with (e.g., served by) the communication network—wherein the service has bounded deviation between a latency requirement of the service and an internal latency performance of the communication network.

That a service is associated with a user device may, for example, include that part of a service application (e.g., an application client) is running on the user device.

The service is the type of service elaborated on above—a service which relates to the communication network such that the latency requirements enforced by the service on the communication between the end points are not impossible, but not easy either, to accommodate by the internal latency performance of the communication network. This type of service is also referred to herein as latency sensitive services. This type of relationship between the service and the communication network is referred to herein by specifying that the deviation between a latency requirement of the service and an internal latency performance of the communication network is bounded.

One example that substantiates the bounded deviation between the latency requirement of the service and the internal latency performance of the communication network is that a ratio between a latency requirement parameter value of the service and an internal latency performance parameter value of the communication network falls within a bounding range. The bounding range may have any suitable value and/or may be dynamic or static.

Alternatively or additionally, one example that substantiates the bounded deviation between the latency requirement of the service and the internal latency performance of the communication network is that a latency requirement parameter value of the service and an internal latency performance parameter value of the communication network are in a same order of magnitude. For example, the same order of magnitude may be defined as not deviating more than a factor, e.g., 2, 5, or 10.

Alternatively or additionally, one example that substantiates the bounded deviation between the latency requirement of the service and the internal latency performance of the communication network is that a latency requirement parameter value of the service and an internal latency performance parameter value of the communication network are equal.

Alternatively or additionally, one example that substantiates the bounded deviation between the latency requirement of the service and the internal latency performance of the communication network is that a required end-to-end round-trip-time of the service falls within a time range specified relative an internal round-trip-time of the communication network.

The latency requirement parameter may, for example, refer to one or more of: latency variation, latency average, probability for latencies above a threshold value, maximum latency, or any other suitable latency metric. The internal latency performance parameter may, for example, be a corresponding parameter of the communication network (i.e., latency variation, latency average, probability for latencies above a threshold value, maximum latency, or any other suitable latency metric).

For 3GPP-based communication networks, the service might, for example, be a service which has a maximum allowable latency which is lower than that of mobile broadband (MBB) services and/or higher than that of ultra-reliable low latency communication (URLLC) services; or correspondingly for any other suitable latency requirement parameter.

The identification in step 110, that a service with bounded deviation between the latency requirement of the service and the internal latency performance of the communication network is currently associated with a user device, may be performed in any suitable way. Some illustrative examples include detecting that a service class identifier is indicative of the service, detecting that a bearer dedicated for low latency requirements is assigned for the service, detecting that single network slice selection assistance information (S-NSSAI) is indicative of the service, and/or determining that a traffic pattern of the service matches a latency sensitive traffic pattern.

In step 160, a configuration of the communication network is dynamically adjusted for the service. Generally, the adjustment may be on user device level (i.e., the dynamically adjusted configuration is applied for all services associated with the user device) or on service level (i.e., a user device associated with different services may have the dynamically adjusted configuration for some services and another—for example, a default—configuration for other services).

In some embodiments, the adjustment is performed only for user devices associated with services with bounded deviation between the latency requirement of the service and the internal latency performance of the communication network. Thus, the adjustment may be applied in a differentiated fashion, whereby user devices associated with a service of this type are subject to the dynamic adjustment of the network configuration while other user devices are not. Hence, the other user devices may apply default configuration of the communication network.

The dynamic adjustment is for latency control as elaborated on above. For example, the dynamic adjustment of the network configuration may provide latency control by reducing the probability that an action needs to be repeated (e.g., reducing the number of retransmissions of a packet), and/or by reducing the duration of performance of an action, for the latency sensitive service.

The dynamic adjustment of the network configuration may comprise any suitable adjustment for latency control. For example, the dynamic adjustment of the network configuration may comprise changing one or more parameter values that control network operation.

Alternatively or additionally, the dynamic adjustment of the network configuration may comprise assigning a bearer dedicated for low latency requirements to the service. This approach typically reduces the probability that an action needs to be repeated since the bearer dedicated for low latency requirements may have a more generous allocation of communication resources. An illustration of this approach comprises assigning a bearer, which is normally for URLLC, for a latency sensitive service.

Alternatively or additionally, the dynamic adjustment of the network configuration may comprise increasing a number of resources for initial uplink grant. This approach typically reduces the duration of performance of an action since more of the data queued up for uplink transmission can be transmitted directly when the number of resources for initial uplink grant is increased. An illustration of this approach comprises switching from a first number of resources for initial uplink grant to a second number of resources for initial uplink grant, wherein the second number is larger than the first number.

Alternatively or additionally, the dynamic adjustment of the network configuration may comprise decreasing a duration between consecutive scheduling request opportunities. This approach typically reduces the duration of performance of an action since data queued up for transmission can be transmitted earlier when scheduling request opportunities appear closer in time to each other. An illustration of this approach comprises switching from a first duration between consecutive scheduling request opportunities to a second duration between consecutive scheduling request opportunities, wherein the second duration is shorter than the first duration.

Alternatively or additionally, the dynamic adjustment of the network configuration may comprise decreasing a target error rate (e.g., a target block error rate, BLER). This approach typically reduces the probability that an action needs to be repeated since a larger amount of received packets will have acceptable error rate. An illustration of this approach comprises switching from a first target error rate to a second target error rate, wherein the second target error rate is lower than the first target error rate.

Alternatively or additionally, the dynamic adjustment of the network configuration may comprise decreasing a coding rate used for retransmissions (e.g., by selection of a suitable modulation and coding scheme, MCS, and or by limitation of which MCS:s are selectable). This approach typically reduces the probability that an action needs to be repeated since a larger amount of received packets will be decodable when a lower coding rate is used. An illustration of this approach comprises switching from a first coding rate to a second coding rate, wherein the second coding rate is lower than the first coding rate.

Alternatively or additionally, the dynamic adjustment of the network configuration may comprise decreasing an order of modulation used for retransmissions (e.g., by selection of a suitable modulation and coding scheme, MCS, and or by limitation of which MCS:s are selectable). This approach typically reduces the probability that an action needs to be repeated since a larger amount of received packets will be decodable when a lower order of modulation is used. An illustration of this approach comprises switching from a first order of modulation to a second order of modulation, wherein the second order of modulation is lower than the first order of modulation. The order or modulation may, generally, be defined as the number of bits that are representable by each modulation symbol.

Alternatively or additionally, the dynamic adjustment of the network configuration may comprise decreasing a maximum coding rate (e.g., by limitation of which MCS:s are selectable). This approach typically reduces the probability that an action needs to be repeated since a larger amount of received packets will be decodable when only relatively low coding rates are used. An illustration of this approach comprises switching from a first maximum coding rate to a second maximum coding rate, wherein the second maximum coding rate is lower than the first maximum coding rate.

Alternatively or additionally, the dynamic adjustment of the network configuration may comprise decreasing a maximum order of modulation (e.g., by limitation of which MCS:s are selectable). This approach typically reduces the probability that an action needs to be repeated since a larger amount of received packets will be decodable when only relatively low modulation orders are used. An illustration of this approach comprises switching from a first maximum order of modulation to a second maximum order of modulation, wherein the second maximum order of modulation is lower than the first maximum order of modulation.

Alternatively or additionally, the dynamic adjustment of the network configuration may comprise using only systematic encoding schemes. Systematic encoding schemes may, generally, be defined as encoding schemes for which the symbols to be encoded appear unchanged among the encoded symbols. This approach typically reduces the probability that an action needs to be repeated since the soft combining benefits from having systematic symbols available when the communication conditions are challenging. An illustration of this approach comprises using only systematic encoding schemes in a HARQ procedure such that information bits are available in all redundancy versions (transmission and re-transmissions) of a packet.

Alternatively or additionally, the dynamic adjustment of the network configuration may comprise decreasing a maximum number of retransmissions (e.g., limiting the allowable number of retransmissions in a HARQ procedure). This approach typically reduces the probability that an action is repeated. An illustration of this approach comprises switching from a first maximum number of retransmissions to a second maximum number of retransmissions, wherein the second maximum number of retransmissions is lower than the first maximum number of retransmissions.

Alternatively or additionally, the dynamic adjustment of the network configuration may comprise adjusting (e.g., decreasing) a duration of one or more timers used for medium access control (MAC) and/or radio link control (RLC). This approach typically reduces the duration of performance of an action since a failing transfer process is aborted earlier when timers have earlier timeout. An illustration of this approach comprises switching from a first duration to a second duration, wherein the second duration is lower than the first duration (i.e., the timer reaches a timeout state faster with the second duration).

Alternatively or additionally, the dynamic adjustment of the network configuration may comprise adjusting a duration of one or more timers used for discontinuous reception (DRX).

Alternatively or additionally, the dynamic adjustment of the network configuration may comprise disabling a measurement gap when it coincides with a retransmission occasion. This approach typically reduces the duration of performance of an action since retransmission occasions are not lost due to measurement gap collision.

In some embodiments, the dynamic adjustment of step 160 is based on a current traffic load of the communication network, as illustrated by optional step 150 and optional sub-step 161. The current traffic load may be for the entire network or for a part of the network (e.g., a serving cell and/or one or more neighboring cells). In these embodiments, the method 100 may also comprise determining the current traffic load of the communication network, as illustrated by optional step 140.

For example, dynamically adjusting the configuration of the communication network may comprise using a first adjustment approach when the current traffic load is less than a first traffic load threshold value, and using a second adjustment approach when the current traffic load is higher than, or equal to, the first traffic load threshold value. This is one example implementation of optional sub-step 161. The first adjustment approach may be more aggressive than the second adjustment approach, wherein a more aggressive may correspond to a larger reduction of the probability that an action needs to be repeated and/or a larger reduction of the duration of performance of an action.

Alternatively or additionally, the dynamic adjustment may be performed only when the current traffic load is less than a second traffic load threshold value. This is illustrated by optional step 150, where the current traffic load is compared to a threshold value (second traffic load threshold value) l_thr. When the load is less than the threshold value (Y-path out of step 150), the method proceeds to step 160 where the dynamic adjustment is performed. When the load is larger than, or equal to, the threshold value (N-path out of step 150) the dynamic adjustment of step 160 is not performed and the process may loop back to step 140 for monitoring of the traffic load or to optional step 120 (described in the following) for buffer monitoring.

The second traffic load threshold value may be different from (e.g., higher than) the first traffic load threshold value.

These embodiments may be beneficial to accommodate traffic for latency sensitive services without, or with relatively low, negative impact on other types of traffic. When the network and/or serving cell is lightly loaded, using a first configuration for latency sensitive traffic that decreases latency at the cost of using more communication resources than a default configuration is beneficial for the latency sensitive services and—since there are resources available—does not impact performance of other services. When the network and/or serving cell is more loaded, a second configuration for latency sensitive traffic may be used that still decreases latency at the cost of using more communication resources than the default configuration, but less communication resources than the first configuration. When the network and/or serving cell is heavily loaded, the default configuration may be used also for latency sensitive traffic.

In some embodiments, latency sensitive services are mapped to bearers dedicated for latency sensitive traffic when the load is low (i.e., when there are resources available), while latency sensitive services are mapped to bearers for regular, best effort, traffic when the load is high.

In some embodiments, the dynamic adjustment of step 160 is based on the status of one or more buffers (compare with 31, 42 of FIG. 1, for example) associated with the service, as illustrated by optional step 130. In these embodiments, the method 100 may also comprise monitoring one or more buffers associated with the service, as illustrated by optional step 120.

For example, the dynamic adjustment may be triggered when a buffer size exceeds a buffer size threshold value. This is illustrated by optional step 130, where the size of one or more buffers is compared to a threshold value (buffer size threshold value) b_thr. When the buffer size exceeds the threshold value (Y-path out of step 130), the method proceeds to step 160 (possibly via steps 140 and 150) where the dynamic adjustment is performed. When the buffer size does not exceed the threshold value (N-path out of step 130) the dynamic adjustment of step 160 is not performed and the process may loop back to step 120 for buffer monitoring. The buffer size may, for example, be defined as an amount of content of a buffer.

In conclusion, FIG. 3 has demonstrated that latency variations of a communication network may be controlled by dynamic configuration of the radio network. For example, the dynamic configuration may reduce the number of latency spikes and/or the duration of latency spikes.

Generally, the behavior and performance of a (radio) communication network may be governed by a large set of configuration parameters. Such parameters are often chosen to attempt optimize the network behavior and performance for services which are not latency sensitive (i.e., services for which the latency requirements on the communication between the end points are easily accommodated by the internal latency performance of the communication network, and the end-to-end communication scenario is unproblematic from a latency perspective). Therefore, it is common that little, or no, consideration is given to providing predictable latency behavior.

Embodiments presented herein suggest choosing one or more parameter values differently, to attempt to optimize the network behavior (e.g., provide predictable latency behavior) for latency sensitive services. Providing predictable latency behavior will typically lead to increased resource consumption in relation to the total traffic served. Hence, applying such different parameter setting might be inefficient and should preferably not be applied for all communication in the network. Therefore, some embodiments presented herein aim to continuously monitor the (radio) communication environment and/or traffic patterns, and dynamically adjust one or more parameters accordingly; to improve the service experience for latency sensitive traffic, while maintaining the performance for best effort traffic. The dynamic adjustment may be adapted based on radio conditions, traffic pattern, cell utilization, and/or other observed parameters for each individual case.

The dynamic adjustment may be applied per user device and/or per service. Traffic differentiation may be achieved by using differentiation functionality such as, for example, dedicated bearers and quality-of-service class identifiers (QCI, 5QI, etc.) profiles. Alternatively or additionally, traffic differentiation may be achieved by application of dynamic parametrization and/or configuration. Traffic differentiation may be based on observed traffic patterns; identifying services that will benefit from latency sensitive network configurations and applying the latency sensitive configuration to these services.

Some configuration areas where the dynamic adjustment of network configuration may be applicable include initial uplink allocation (IUA) profile, prescheduling profile, target error rate (e.g., target BLER), maximum number of HARQ retransmissions, scheduling grant periodicity, DRX timers, RLC timer(s), MAC timer(s), and measurement gap timing.

By monitoring the communication environment and/or traffic patterns and adjusting one or more parameters accordingly, low latency may be traded off against resource consumption and/or traffic needs. Furthermore, by differentiating the network behavior based on the type of service/application as proposed herein, the latency requirements specific for latency sensitive service can be efficiently fulfilled. As mentioned before, the dynamic adjustment may be performed exclusively for latency sensitive services (or exclusively for user devices associated with a latency sensitive service). Alternatively or additionally, the dynamic adjustment may be based on traffic load and/or buffer sizes. In some approaches for meeting the latency requirements of a latency sensitive service, it is to be avoided that buffers/queues associated with the service build up extensively. Generally, any queue anywhere between communication end points (e.g., in the communication network) might add latency in the traffic delivery.

Some various illustrative examples of dynamic adjustment of the communication network configuration are presented in the following.

For example, the dynamic adjustment may aim to decrease the number of HARQ retransmissions. As is well known, HARQ retransmissions are used to combine soft values of the same codeword from several transmissions, which—at least if the code rate applied is close to a suitable code rate for the instantaneous channel conditions—provides an efficient method to recover from a small fading dip. However, if the channel conditions are much worse than assumed by the code rate selection, HARQ retransmissions will typically not be able to provide recovery for a codeword received poorly in the initial transmission. In the latter case, timers in higher protocol layers will be triggered and a new transmission opportunity will be initiated.

For best effort traffic (e.g., when the latency requirements on the communication between the end points are easily accommodated by the internal latency performance of the communication network), the added latency due to futile HARQ retransmissions and/or HARQ process restart by higher protocol layers does not adversely impact the end user experience. For latency sensitive traffic (e.g., when the latency requirements on the communication between the end points is possible, but not easily, accommodated by the internal latency performance of the communication network), the added latency may be detrimental; breaking the latency budget and appear as bad performance of the end user service.

To overcome (or at least mitigate) the problem of added latency due to HARQ retransmissions and/or HARQ process restart, latency sensitive traffic can be differentiated by configuring one or more HARQ-related parameters of the system differently compared to best effort traffic.

For example, the dynamic adjustment may comprise using adaptive HARQ retransmissions, wherein a code rate which is lower than the selected code rate is used for retransmissions. This approach may enable the HARQ process to recover the codeword in a deep fading dip, where the selected code rate is too optimistic.

Alternatively or additionally, the dynamic adjustment may comprise completely aborting an ongoing HARQ process and flush the corresponding soft combining buffer at the receiving node, to avoid using soft bits with bad quality in the combining process. When retransmission (i.e., HARQ process restart) is triggered on RLC level, the ongoing HARQ process is aborted and the corresponding soft combining buffer is flushed at the receiving node. Some embodiments propose a possibility to initiate HARQ process restart from layer 1 to avoid waiting for higher layer protocol timers to trigger the retransmission.

Alternatively or additionally, the dynamic adjustment may comprise differentiating based on settings for BLER target. The BLER target for best effort traffic may typically be set to 10% (i.e., one out of ten transmission blocks over the air interface will fail and need to utilize HARQ retransmissions and/or retransmissions at higher protocol layers to be correctly received). This operating point is typically chosen to balance the number of retransmissions against resource utilization of the air interface link. If the BLER target is decreased, the number of retransmissions will decrease while more communication resources will be used per transmission. Consequently, the BLER target value may be decreased for latency sensitive traffic.

Alternatively or additionally, the dynamic adjustment may comprise applying a lowered maximum allowable code rate for latency sensitive traffic and/or using systematic coding schemes. In some coding scheme collections, the lower code rates are based on systematic coding such that information bits are present in all redundancy versions of the codeword.

Alternatively or additionally, the dynamic adjustment may comprise applying different timer settings (e.g., for RLC and/or MAC retransmissions timers, such as the timers retxBSR-Timer and t-PollRetransmit in 3GPP-standards). The timer setting may, for example, impact how long time it takes for RLC to recover after a packet loss at the RLC layer.

Alternatively or additionally, the dynamic adjustment may comprise dynamically disabling of measurement gaps. Measurement gaps may be configured for the user device to enable the user device to perform measurements (e.g., on neighbouring cells). Measurement gaps may be configured in radio resource control (RRC). During a measurement gap, the user device is typically not able to maintain the data connection (i.e., not able to transmit or receive in the communication link). Thus, if a measurement gap coincides with a retransmission, the retransmission may need to be postponed. The resulting delay may be detrimental for latency sensitive traffic. By dynamically disabling measurement gaps coinciding with retransmissions, this extra delay can be avoided.

Alternatively or additionally, the dynamic adjustment may comprise configuring a larger initial uplink (UL) grant for latency sensitive traffic than for best effort traffic. When a scheduling request is received by the network, the network typically does not have any knowledge of how much data the user device has in its transmission buffer. A buffer status report will typically be received by the network together with the first UL transmission after the scheduling request. By increasing the initial UL grant, the first transmission may be able to carry more data (e.g., the transmission buffer data) and the data transfer delay will be decreased.

Figure 4:
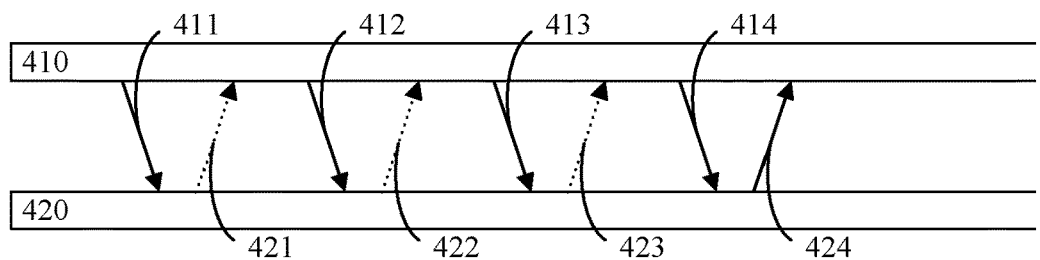
FIG. 4 is a schematic drawing illustrating example principles according to some embodiments.

FIG. 4 schematically illustrates an example where a HARQ process comprises transmission 411 of a packet from one communication node 410 (e.g., a network node) to another communication node 420 (e.g., a user device). If no acknowledgement is received in an expected acknowledgement occasion 421, the packet is retransmitted as illustrated by 412.

Typically, the packet is retransmitted 412, 413, 414 as long as no acknowledgement is received in expected acknowledgement occasions 421, 422, 423 (i.e., until an acknowledgement 424 is received) or until a maximum allowable number of retransmissions have been performed. Some embodiments suggest latency control by decreasing the maximum allowable number of retransmissions for latency sensitive services.

Figure 5:
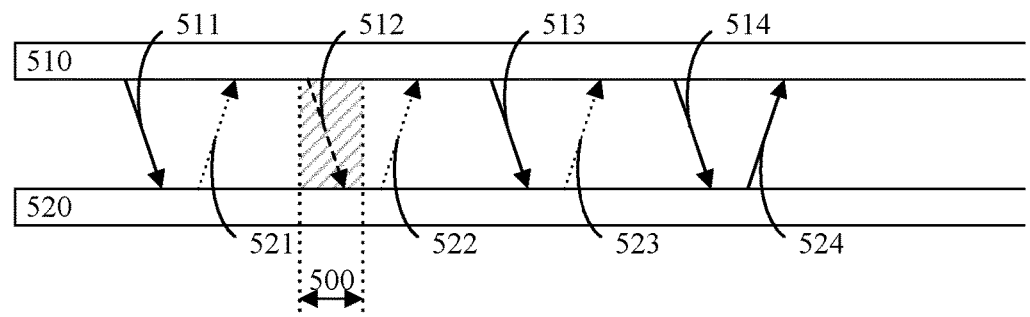
FIG. 5 is a plot diagram illustrating example principles according to some embodiments.

FIG. 5 schematically illustrates an example where a HARQ process comprises transmission 511 of a packet from one communication node 510 (e.g., a network node) to another communication node 520 (e.g., a user device). Typically, the packet is retransmitted 512, 513, 514 as long as no acknowledgement is received in expected acknowledgement occasions 521, 522, 523 (i.e., until an acknowledgement 524 is received) or until a maximum allowable number of retransmissions have been performed. A measurement gap may, for example, be defined as a duration of time in which the user device is to perform measurements (e.g., signal quality measurements on serving and/or neighboring cells for reporting to the network node). Some embodiments suggest latency control by disabling any measurement gap which coincides with a retransmission occasion, as exemplified by the measurement gap 500 and retransmission occasion 512.

Figure 6:
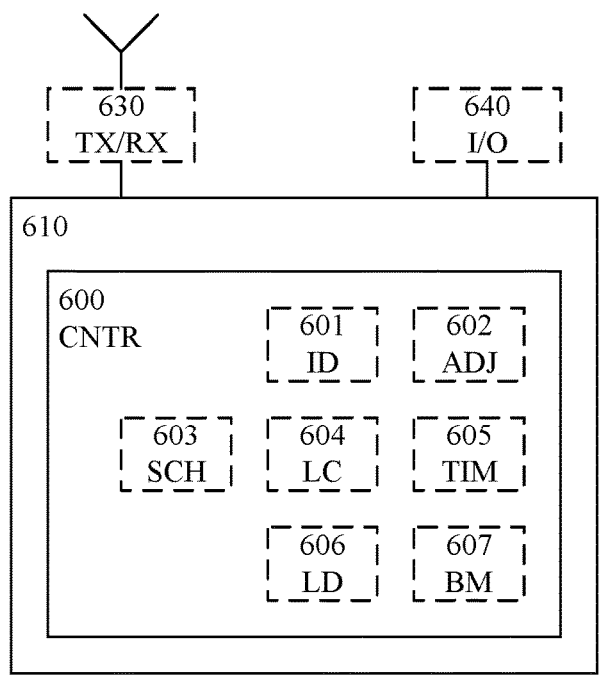
FIG. 6 is a schematic block diagram illustrating an example apparatus according to some embodiments.

FIG. 6 schematically illustrates an example apparatus 610 for latency control in a communication network according to some embodiments. The apparatus 610 may, for example, be comprisable (e.g., comprised) in a network node (e.g., a radio access node such as a base station, or a central processing node). Alternatively or additionally, the apparatus 610 may be configured to cause execution of one or more of the method steps described herein (e.g., in connection with the method 100 of FIG. 3). The apparatus comprises a controller (CNTR; e.g., controlling circuitry or a control module) 600.

The controller 600 is configured to cause identification that a service is currently associated with a user device associated with the communication network, with bounded deviation between a latency requirement of the service and an internal latency performance of the communication network (compare with step 110 of FIG. 3).

To this end, the controller 600 may comprise or be otherwise associated with (e.g., connectable, or connected, to) an identifier (ID; e.g., identifying circuitry or an identification module) 601. The identifier may be configured to identify that a service is currently associated with a user device associated with the communication network, with bounded deviation between a latency requirement of the service and an internal latency performance of the communication network.

The controller 600 is also configured to cause dynamic adjustment of a configuration of the communication network for the service (compare with step 160 of FIG. 3).

To this end, the controller 600 may comprise or be otherwise associated with (e.g., connectable, or connected, to) an adjuster (ADJ; e.g., adjusting circuitry or an adjustment module) 602. The adjuster may be configured to dynamically adjust the configuration of the communication network for the service.

For example, the controlling circuitry may be configured to cause dynamic adjustment of the configuration of the communication network for the service by causing assignment of a bearer dedicated for low latency requirements to the service, and/or increase of a number of resources for initial uplink grant, and/or decrease of a duration between consecutive scheduling request opportunities.

To this end, the controller 600 may comprise or be otherwise associated with (e.g., connectable, or connected, to) a scheduler (SCH; e.g., scheduling circuitry or a scheduler module) 603. The scheduler may be configured (e.g., based on instructions from the adjuster) to assign the bearer dedicated for low latency requirements to the service, and/or to increase the number of resources for initial uplink grant, and/or to decrease the duration between consecutive scheduling request opportunities.

Alternatively of additionally, the controlling circuitry may be configured to cause dynamic adjustment of the configuration of the communication network for the service by causing decrease of a target error rate, and/or decrease of a coding rate used for retransmissions, and/or decrease of an order of modulation used for retransmissions, and/or decrease of a maximum coding rate, and/or decrease of a maximum order of modulation, and/or use of only systematic encoding schemes, and/or decrease of a maximum number of retransmissions.

To this end, the controller 600 may comprise or be otherwise associated with (e.g., connectable, or connected, to) a link controller (LC; e.g., link controlling circuitry or a link control module) 604. The link controller may be configured (e.g., based on instructions from the adjuster) to decrease the target error rate, and/or decrease the coding rate used for retransmissions, and/or decrease the order of modulation used for retransmissions, and/or decrease the maximum coding rate, and/or decrease the maximum order of modulation, and/or use only systematic encoding schemes, and/or decrease the maximum number of retransmissions.

Alternatively of additionally, the controlling circuitry may be configured to cause dynamic adjustment of the configuration of the communication network for the service by causing adjustment of a duration of one or more timers used for medium access control (MAC) and/or radio link control (RLC) and/or discontinuous reception (DRX) control.

To this end, the controller 600 may comprise or be otherwise associated with (e.g., connectable, or connected, to) one or more timers (TIM; e.g., timing circuitry or timer module(s)) 605. The one or more timers may be configured (e.g., based on instructions from the adjuster) to apply the adjusted duration.

Alternatively of additionally, the controlling circuitry may be configured to cause dynamic adjustment of the configuration of the communication network for the service by causing disabling of a measurement gap when it coincides with a retransmission occasion. The disabling of the measurement gap may, typically, comprise indicating to the user device that the measurement is disabled (i.e., configuring the user device to not perform measurements in the measurement gap by transmission of a configuration message).

To this end, the controller 600 may comprise or be otherwise associated with (e.g., connectable, or connected, to) a transmitter (TX; e.g., transmitting circuitry or a transmission module) 630 and/or an apparatus interface (I/O; e.g., interface circuitry or an interface module) 640. The transmitter may be configured to transmit the configuration message to the user device (e.g., when the apparatus is comprisable in a radio access node). The interface may be configured to transfer the configuration message to a radio access node for transmission to the user device (e.g., when the apparatus is comprisable in a central processing node).

In some embodiments, the controller may be further configured to cause determination of a current traffic load of the communication network, and the dynamic adjustment of the configuration of the communication network to be based on the current traffic load (compare with steps 140, 150, 161 of FIG. 3).

To this end, the controller 600 may comprise or be otherwise associated with (e.g., connectable, or connected, to) a load determiner (LD; e.g., load determining circuitry or a load determination module) 606. The load determiner may be configured to determine the current traffic load of the communication network and cause the dynamic adjustment of the configuration of the communication network to be based on the current traffic load (e.g., by provision of control and/or load indicator signaling to the adjuster).

In some embodiments, the controller may be further configured to cause monitoring of one or more buffers associated with the service, and triggering of the dynamic adjustment of the configuration of the communication network responsive to a buffer size exceeding a buffer size threshold value (compare with steps 120, 130 of FIG. 3).

To this end, the controller 600 may comprise or be otherwise associated with (e.g., connectable, or connected, to) a buffer monitor (BM; e.g., buffer monitoring circuitry or a buffer monitor module) 607. The buffer monitor may be configured to monitor one or more buffers associated with the service and trigger the dynamic adjustment of the configuration of the communication network responsive to a buffer size exceeding a buffer size threshold value (e.g., by provision of control and/or buffer size signaling to the adjuster).

In some embodiments, the controlling circuitry may be configured to cause the dynamic adjustment of the configuration of the communication network only for user devices associated with services with bounded deviation between the latency requirement of the service and the internal latency performance of the communication network.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 7:
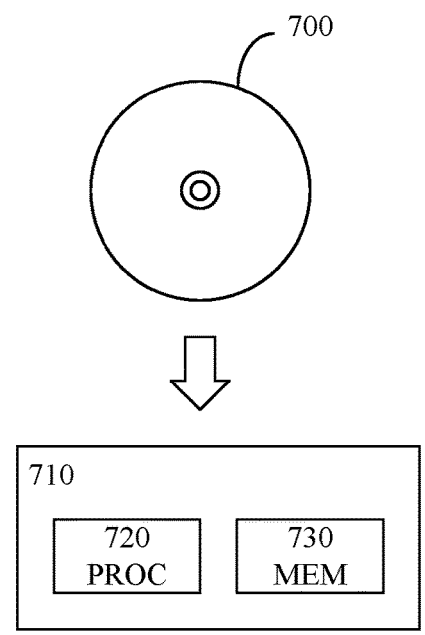
FIG. 7 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry or a data processing unit) 720, which may, for example, be comprised in a network node 710. When loaded into the data processor, the computer program may be stored in a memory (MEM) 730 associated with or comprised in the data processor. According to some embodiments, the computer program may, when loaded into and run by the data processor, cause execution of method steps according to, for example, any of the methods as illustrated in FIG. 3 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for latency control in a communication network, the method comprising:
    identifying that a service is currently associated with a user device associated with the communication network, wherein a deviation between a latency requirement of the service and an internal latency performance of the communication network is bounded in that a ratio between a latency requirement parameter value of the service and a corresponding internal latency performance parameter value of the communication network falls within a bounding range, wherein each of the latency requirement parameter and the corresponding internal latency performance parameter is one of: an average duration of transfer, a maximum duration of transfer, and a variance of duration of transfer; and
    dynamically adjusting a configuration of the communication network for the service to decrease the internal latency performance parameter value for the communication network.

2. The method of claim 1, wherein dynamically adjusting the configuration of the communication network is performed only for services with bounded deviation between the latency requirement of the service and the internal latency performance of the communication network.

3. The method of claim 1, wherein dynamically adjusting the configuration of the communication network comprises controlling the communication network to provide latencies below a maximum latency threshold for the service.

4. The method of claim 1, further comprising determining a current traffic load of the communication network, and wherein dynamically adjusting the configuration of the communication network is based on the current traffic load.

5. The method of claim 4, wherein dynamically adjusting the configuration of the communication network comprises using a first adjustment approach when the current traffic load is less than a first traffic load threshold value, and using a second adjustment approach when the current traffic load is higher than, or equal to, the first traffic load threshold value.

6. The method of claim 4, wherein dynamically adjusting the configuration of the communication network comprises performing adjustment only when the current traffic load is less than a second traffic load threshold value.

7. The method of claim 1, further comprising monitoring one or more buffers associated with the service, wherein dynamically adjusting the configuration of the communication network is triggered when a buffer size exceeds a buffer size threshold value.

8. The method of claim 1, wherein dynamically adjusting the configuration of the communication network for the service comprises one or more of:
    assigning a bearer dedicated for low latency requirements to the service;
    increasing a number of resources for initial uplink grant;
    decreasing a duration between consecutive scheduling request opportunities;
    decreasing a target error rate;
    decreasing a coding rate used for retransmissions;
    decreasing an order of modulation used for retransmissions;
    decreasing a maximum coding rate;
    decreasing a maximum order of modulation;
    using only systematic encoding schemes;
    decreasing a maximum number of retransmissions;
    adjusting a duration of one or more timers used for medium access control, MAC, and/or radio link control, RLC, and/or discontinuous reception, DRX; and
    disabling a measurement gap when it coincides with a retransmission occasion.

9. The method of claim 1, wherein identifying that a service is currently associated with a user device, wherein the deviation between the latency requirement of the service and the internal latency performance of the communication network is bounded, comprises one or more of:
    detecting that a service class identifier is indicative of the service;
    detecting that a bearer dedicated for low latency requirements is assigned for the service; and
    determining that a traffic pattern of the service matches a latency sensitive traffic pattern.

10. The method of claim 1, wherein the bounded deviation between the latency requirement of the service and the internal latency performance of the communication network comprises one or more of:
    a ratio between a latency requirement parameter value of the service and an internal latency performance parameter value of the communication network not exceeding a bounding threshold;
    a latency requirement parameter value of the service and an internal latency performance parameter value of the communication network being in a same order of magnitude;
    a latency requirement parameter value of the service and an internal latency performance parameter value of the communication network being equal; and a required end-to-end round-trip-time of the service falling within a time range specified relative an internal round-trip-time of the communication network.

11. The method of claim 1, wherein the service has a maximum allowable latency which is lower than that of mobile broadband, MBB, services and/or higher than that of ultra-reliable low latency communication, URLLC, services.

12. The method of claim 1, wherein the latency control comprises one or more of:
    decrease of latency variance associated with the communication network for the user device;
    decrease of a maximum latency associated with the communication network for the user device;
    decrease of a number of latency events associated with the communication network for the user device, that exceed a latency threshold value; and
    decrease of an average latency associated with the communication network for the user device.

13. A computer program product comprising a non-transitory computer readable medium, having thereon a computer program comprising program instructions, the computer program being loadable into a data processing unit and configured to cause execution of the method according to claim 1 when the computer program is run by the data processing unit.

14. An apparatus for latency control in a communication network, the apparatus comprising controlling circuitry configured to cause:

identification that a service is currently associated with a user device associated with the communication network, wherein a deviation between a latency requirement of the service and an internal latency performance of the communication network is bounded in that a ratio between a latency requirement parameter value of the service and a corresponding internal latency performance parameter value of the communication network falls within a bounding range, wherein each of the latency requirement parameter and the corresponding internal latency performance parameter is one of: an average duration of transfer, a maximum duration of transfer, and a variance of duration of transfer; and dynamic adjustment of a configuration of the communication network for the service to decrease the internal latency performance parameter value for the communication network.

15. The apparatus of claim 14, wherein the controlling circuitry is configured to cause the dynamic adjustment of the configuration of the communication network to be performed only for services with bounded deviation between the latency requirement of the service and the internal latency performance of the communication network.

16. The apparatus of claim 14, wherein the controlling circuitry is configured to cause the dynamic adjustment of the configuration of the communication network by causing control the communication network to provide latencies below a maximum latency threshold for the service.

17. The apparatus of claim 14, wherein the controlling circuitry is further configured to cause determination of a current traffic load of the communication network, and wherein the dynamic adjustment of the configuration of the communication network is based on the current traffic load.

18. The apparatus of claim 17, wherein the controlling circuitry is configured to cause the dynamic adjustment of the configuration of the communication network by causing use of a first adjustment approach when the current traffic load is less than a first traffic load threshold value, and use of a second adjustment approach when the current traffic load is higher than, or equal to, the first traffic load threshold value.

19. The apparatus of claim 17, wherein the controlling circuitry is configured to cause the dynamic adjustment of the configuration of the communication network by causing performance of adjustment only when the current traffic load is less than a second traffic load threshold value.

20. The apparatus of claim 14, wherein the controlling circuitry is further configured to cause monitoring of one or more buffers associated with the service, and triggering of the dynamic adjustment of the configuration of the communication network responsive to a buffer size exceeding a buffer size threshold value.

* * * * *